United States Patent [19]  
Pettis, Jr. et al.

[11] 3,756,373  
[45] Sept. 4, 1973

[54] BUFFER CONVEYOR
[75] Inventors: Charles R. Pettis, Jr.; Victor Del Rosso, both of Ithaca, N.Y.
[73] Assignee: Hi-Speed Checkweigher Co., Inc., Ithaca, N.Y.
[22] Filed: Aug. 22, 1972
[21] Appl. No.: 282,858

[52] U.S. Cl................... 198/75, 141/167, 141/168, 141/180, 209/121
[51] Int. Cl............................................ B65g 37/00
[58] Field of Search .................... 214/2; 198/1, 75, 198/39; 209/121; 141/83, 129, 140–143, 167, 168, 180

[56]     References Cited
         UNITED STATES PATENTS
3,343,649  9/1967  House ............................. 198/39 X
3,640,384  2/1972  Del Rosso ...................... 209/121 X

*Primary Examiner*—Richard A. Schacher
*Attorney*—John B. Bean et al.

[57]         ABSTRACT

A buffer conveyor system is employed to interface a package filler machine having a substantially constant demand or fixed input requirement with a commodity batch weigher/checkweigher having a variable output potentially in excess of the fixed input, but subject to rejects. The system includes novelly designed commodity transport buckets, which are transported by conveyors along a closed loop path through the batch weigher/checkweigher, a filled bucket buffer or holding station and the package filler under the control of fail safe escapements or indexing devices. Release of filled buckets from the buffer station is determined by demand of the package filler, whereas output of the batch weigher/checkweigher is determined by the number of filled buckets present in the buffer station.

7 Claims, 5 Drawing Figures

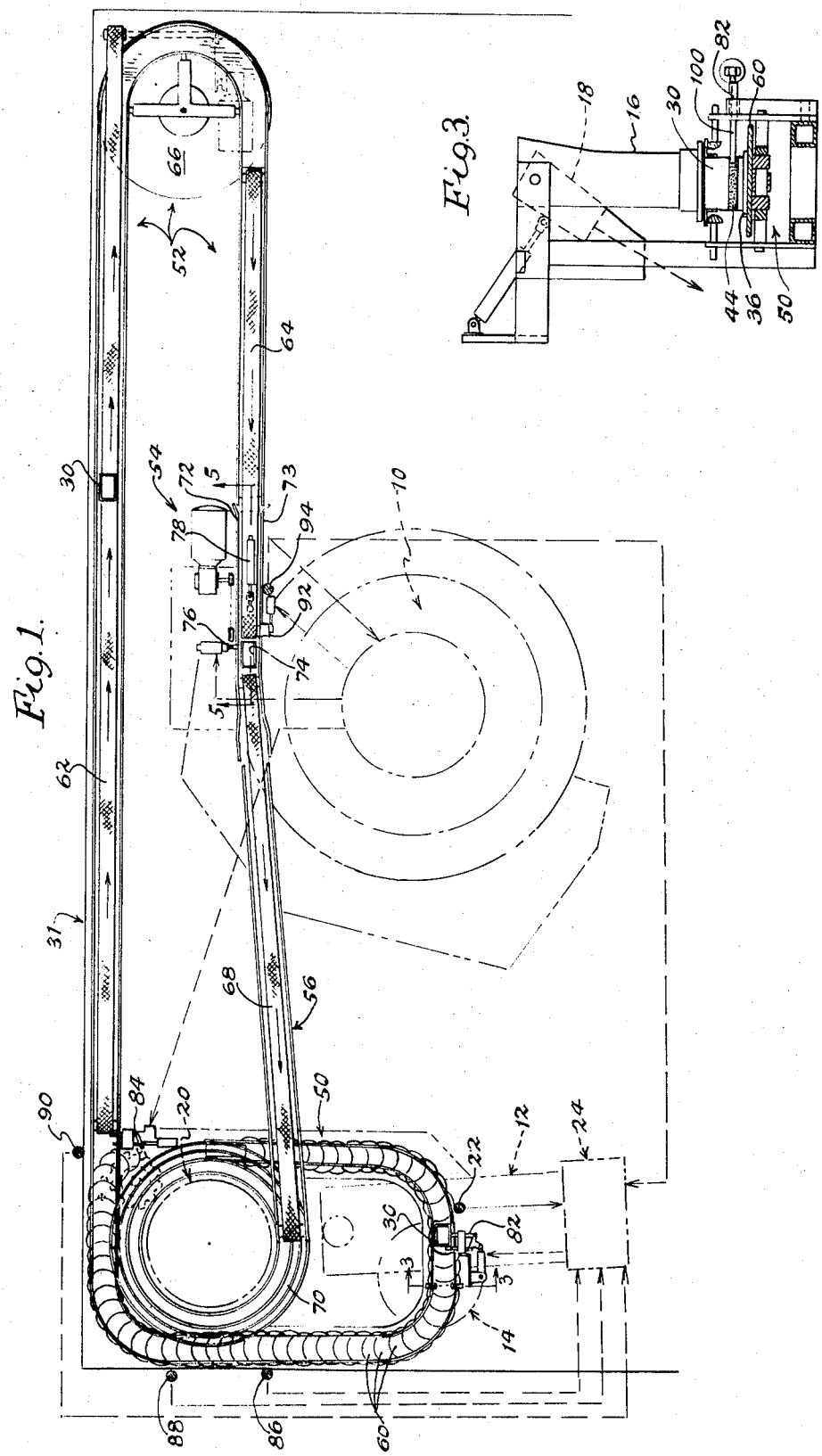

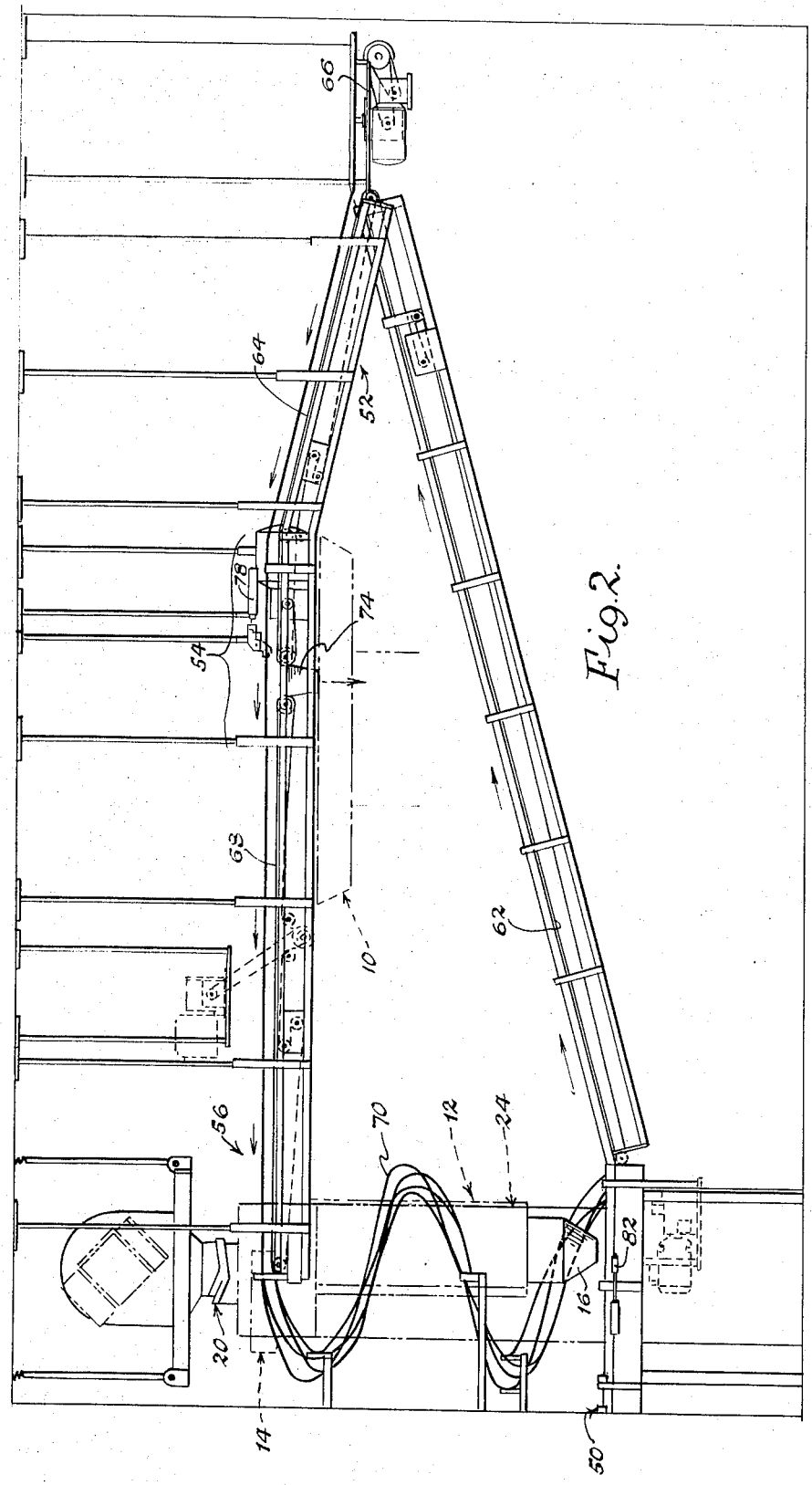

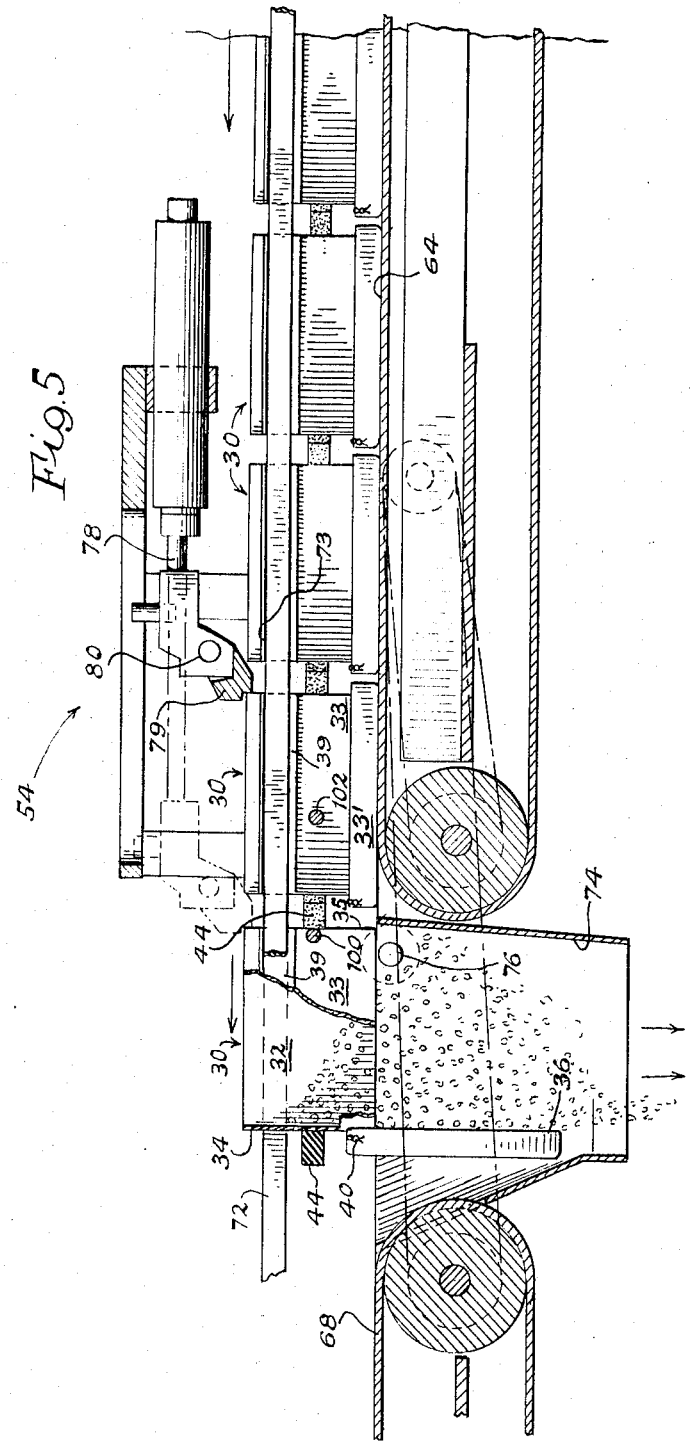

BUFFER CONVEYOR

SUMMARY OF THE INVENTION

This invention relates to a buffer conveyor system for interfacing or interconnecting a commodity batch weigher/ checkweigher (hereinafter referred to as "weigher") and a package filler machine (hereinafter referred to as "filler"). The filler is of the type having a substantially constant or fixed input requirement, while the weigher is of the type having a variable output, which is potentially in excess of the fixed input in order to compensate for occasional rejects, due to either underweight or overweight discharges therefrom.

Proper weight batch discharged from the weigher are delivered to the filler in separate buckets, which are passed successively along a closed loop path through the weigher, a filled bucket buffer or holding station and the filler. The system is automatically controlled and operable to release filled buckets from the buffer station one at a time upon demand of the filler; the output of the weigher being determined by the number of filled buckets awaiting release from the buffer station.

A feature of the present system is that it can accommodate within a minimum of floor space a closed loop path of bucket travel between both vertically and horizontally spaced bucket fill and dump positions defined by the weigher and filler.

The present system also features novelly designed buckets characterized as having a pair of spaced sidewalls, spaced front and rear walls edge joined to the side walls to form a generally rectangular bucket having an open top and bottom; a bottom wall hingedly mounted adjacent the front wall for vertical pivotal movement between bucket bottom closing and opening positions; a pair of carrier bars carried one on each of the side walls for selectively supporting the bucket; and a bumper attached to the front wall to extend transversely thereof and project outwardly beyond at least one of the side walls. The bumper serves as a convenient shock cushioning spacer between adjacent buckets and cooperates with a plurality of multiple pin, fail-safe escapement or indexing devices to control passage of the buckets through the system.

DRAWINGS

The nature and mode of the present invention will now be more fully described in the following detailed description taken with the accompanying drawings wherein:

FIG. 1 is a top plan view of the buffer interface conveyor system of the present invention;

FIG. 2 is a side elevational view thereof;

FIG. 3 is a sectional view taken generally along line 3—3 in FIG. 1;

FIG. 5 is a sectional view taken generally along line 5—5 in FIG. 1.

DETAILED DESCRIPTION

Figure 4:
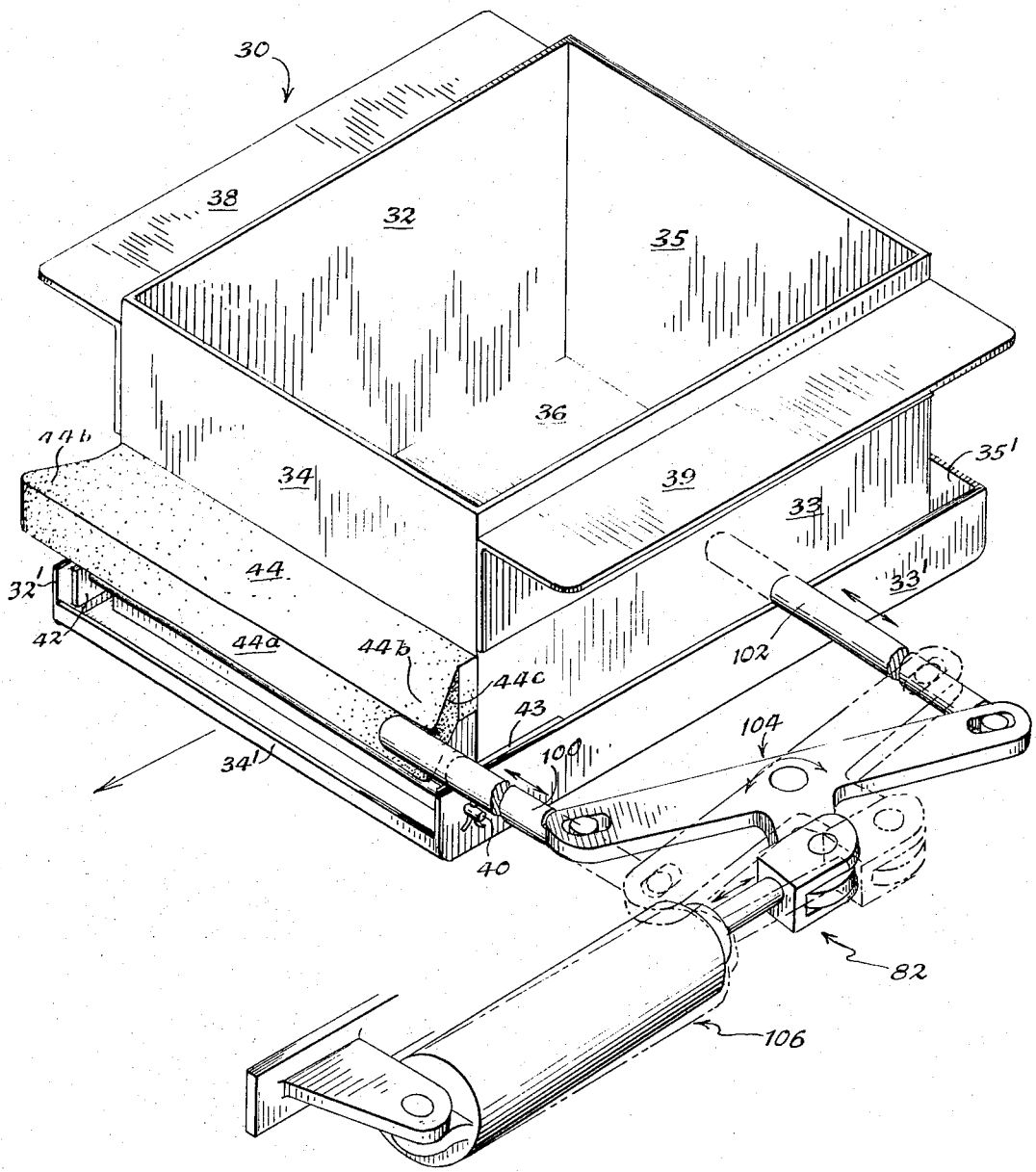
FIG. 4 is a perspective view of a bucket and escapement employed in the practice of the present invention.

Now referring particularly to FIG. 1, it will be understood that the present system has utility in interfacing or interconnecting a "top-filled" package filler machine, which is generally designated as 10 and hereinafter referred to as "filler," and a "bottom-discharging" batch weigher/checkweigher unit, which is generally designated as 12 and hereinafter referred to as "weigher."

The specific construction of filler 10 forms no part of the present invention other than that of placing a demand on the system for the supply of accurately weighed batches of a commodity at a substantially constant or fixed input rate. Filler 10 would of course include means, not shown, for supplying a demand signal to the system each time a batch is required to be dumped downwardly thereinto.

In a like manner, the specific construction of weigher 12 forms no part of the present invention other than that of providing a variable batch output, which is potentially in excess of the fixed input to filler 10 in order to compensate for weighed batches rejected due to either underweight or overweight conditions. For purposes of reference, however, weigher 12 may be of the type having a bulk weighing scale, not shown, into which commodity is fed from a supply hopper 14 in order to form the bulk of the batch to be dispensed, at least one additional scale, not shown, arranged to receive the discharge from the bulk sale as well as additional small quantities of commodity required to bring the batch up to a predetermined weight, and a checkweighing scale, not shown, arranged to receive the discharge from the last of the additional scales. If the checkweighing scale determines that the batch is of the predetermined weight, it is discharged downwardly through a discharge chute designated at 16 in FIGS. 1 and 3. If the batch is determined to be either underweight or overweight it is rejected from the system by a suitable diverter 18, shown only in FIG. 3, for suitable disposition, such as return to the supply hopper by a suitable elevator device designated generally as 20 in FIGS. 1 and 2. For high speed operating conditions, it is conventional to provide a pair of weighers of the type described, which alternately discharge into a common discharge chute 16, in the manner generally described in commonly assigned U.S. Pat. No. 3,426,853. Of course, a suitable empty bucket sensor, shown generally at 22 only in FIG. 1, would be employed to overcontrol the weigher control circuit generally designated at 24 in order to permit dumping of the checkweighing scale only when a batch receiver or carrier bucket 30 of the present system is positioned below discharge 16.

In accordance with the present invention, a closed loop conveyor system generally designated as 31 in FIG. 1 is employed to transport a plurality of buckets 30 sequentially in an end to end relationship for the purpose of receiving batches of commodity discharged from weigher 12 and transferring such batches for discharge to filler 10.

Now referring particularly to FIG. 4, it will be seen that carrier buckets 30 are similar in construction to those described in commonly assigned U.S. Pat. No. 3,640,384 in that they generally include a pair of spaced side walls 32 and 33; spaced front and rear walls 34 and 35, which are edge joined to the sidewalls to form a generally rectangular bucket having an open top and bottom; a bottom wall 36, which is hingedly mounted for movement between a bucket bottom closed and opened positions;and a pair of L-shaped carrier bars 38 and 39, which are affixed to sidewalls 32 and 33. When a bucket bottom wall is engaged by the conveyor system to be described, it is maintained in closed position wherein it serves to support its bucket and contents. Upon release of the bottom wall for movement into its opened position in order to discharge a batch, carrier bars 38 and 39 serve to support the bucket.

The present construction differs, however, in that the side, front and rear marginal edges of bottom wall 36 are disposed relatively outwardly of walls 32, 33, 34 and 35 and have side, front, and rear wall flanges 32', 33', 34' and 35', upstanding therefrom. Thus, the bottom wall when disposed in closed position additionally serves to define an upwardly open pan to retain portions of the batch, which may sift between the lower marginal edges of the side, front and rear walls and the upper surface of the bottom wall. Bottom wall 36 is preferably hingedly mounted by means of a single hinge pin 40 passing through aligned apertures in side wall flanges 32' and 33' and aligned apertures provided in side wall mounted brackets 42 and 43 at a point forwardly of front wall 34 in order to facilitate closing thereof in the manner to be described.

A particularly important feature of the present bucket construction is the provision of a shock-absorbing bumper 44, which is affixed to front wall 34 to extend forwardly thereof to define a planar surface 44a for engagement with the rear wall of an adjacent bucket in order to provide a convenient spacer between metal components of adjacent buckets. Bumper 44 is also dimensioned to extend transversely of front wall 34 outwardly beyond at least one of side walls 32 and 33 in order to provide a stop or abutment 44b for controlling movement of its associated bucket through the conveyor system in the manner to be described. As will be noted from FIG. 4, each of stops 44b defines a side surface 44c, which tapers inwardly and rearwardly from adjacent planar surface 44a to a point at which it lies essentially flush with its associated bucket side wall. If desired, bumper 44 may be alternatively fixed to the rear wall of its associated bucket.

The conveyor system 31 is best shown in FIGS. 1 and 2 as generally including a first, essentially horizontally disposed oval loop conveyor system 50 for transporting buckets 30 in bottom wall closed condition through a filling station beneath weigher discharge chute 16; a second conveyor system 52, which serves to elevate and transfer filled buckets in bottom wall closed condition from conveyor system 50 to a dump or discharge station 54 arranged above filler 10; and a third conveyor system 56 for lowering and transferring empty buckets in bottom wall closed condition from station 54 to conveyor system 50. More specifically, first conveyor system 50 is shown as being in the form of a continuously driven chain type conveyor having relatively movable "Crescent" type bucket supporting links 60; second conveyor system 52 is shown as including a pair of vertically inclined, essentially parallel continuously driven belt conveyors 62 and 64, which are end joined by a suitably powered turntable 66; and third conveyor system 56 is shown as including an essentially horizontally disposed, continuously driven belt conveyor 68 and a gravity feed chute 70, which is disposed to extend or circle downwardly about elevator 20 to deposit buckets 30 on first conveyor system 50 immediately upstream of weigher 12. As is conventional, suitable bucket side guide rails are provided in association with each of the conveyors. By this arrangement buckets 30 may be both vertically and horizontally displaced between their fill and dump positions defined by weigher 12 and filler 10 within a minimum of floor space, and without resorting to complex powered elevators.

Dump station 54 is shown in FIGS. 1 and 5 as including a pair of parallel, horizontally disposed guide rails 72 and 73 arranged to support buckets 30, when the latter are positioned over a dump discharge chute 74, by engagement with the bucket carrier bars 38 and 39, respectively. A pneumatically operable pin 76 is arranged above chute 74 for reciprocating movements transversely of the path of bucket travel for the purpose of releasably supporting the bucket bottom walls in closed position; and a pneumatically operable reciprocating pusher bar 78 is arranged above the downstream end of belt conveyor 64 for the purpose of pushing the buckets one at a time to a position overlying chute 74. As best shown in FIG. 5 pusher bar 78 is formed with a bucket rear wall engaging pawl 79, which is free to pivot in a clockwise direction about pin shaft 80 to permit return movement thereof from its extended phantom line position to its retracted full line position at the completion of a bucket forwarding cycle.

In addition to sensor 22, there are associated with first conveyor system 50, first and second escapements or indexing devices 82 and 84, and first, second and third filled bucket sensor devices 86, 88 and 90. Also, there are associated with dump station 54 an escapement 92, and a fourth bucket sensor device 94. The several sensors employed with the present conveyor system may be of conventional construction. However, the sensors are preferably of the fluidic type in order to increase dependability of the system and for purposes of safety particularly where the system is used in an explosive prone environment.

While escapements 82, 84 and 92 may also be of any conventional construction, they are preferably of the type shown in FIG. 4 in the case of escapement 82. More specifically, each of the escapements comprises downstream and upstream members 100 and 102, which are suitably supported for reciprocating movements transversely of the path of bucket travel under the control of a linkage 104 and a fluid cylinder operator 106. When operator 106 is in its contracted condition, members 100 and 102 are disposed in their first or normal condition shown in full line in FIG. 4, wherein the members are disposed inwardly and outwardly of bumper stop 44b with member 100 in bucket travel constraining engagement with surface 44a. When operator 106 is extended, members 100 and 102 are moved into their second or intermediate phantom line position, wherein member 100 is disposed outwardly of bumper stop 44b and member 102 is disposed inwardly of the bumper stop immediately adjacent bucket side wall 33.

It will be understood that during each operational cycle of operator 106, members 100 and 102 are first moved from their first condition into their second condition and then immediately returned to their first condition; the speed of operation being correlated with the speed of the associated bucket conveyor and bucket dimensions to permit the member 100 to be withdrawn from engagement with the bumper stop of a first downstream bucket in a line of buckets to be released and then be returned for engagement by the bumper stop of a next succeeding or adjacent bucket. Upstream member 102 serves as a fail-safe device to prevent discharge of plural buckets in the event actuator 106 malfunctions and fails to return member 100 to its normal bucket arresting position, since member 102 is automatically moved into position for engagement by the bumper stop of a succeeding bucket as member 100 is moved to its intermediate release position. As will be apparent from viewing FIG. 4, the provision of a pair of bumper stops 44b on each of buckets 30 permits the escapements to be arranged on both sides of the bucket path of travel.

To facilitate description of the mode of operation of conveyor system 31, it will be assumed that the system is operating normally and that the input requirement of filler 10 is 50 batches/minute and that the maximum output of weigher 12 is 60 batches/minute. Under normal operating conditions, there will be a line of empty buckets arranged end to end in an empty bucket storage area extending upstream from escapement 82 on conveyor 50 with the downstream one of such buckets disposed to receive a batch when discharged from weigher 12 through chute 16; a line of filled buckets arranged end to end in a filled bucket buffer or holding station or area extending upstream from escapement 84 on conveyor 50; a line of filled buckets arranged end to end in a dump storage station or area extending upstream from escapement 92 on conveyor 64; a plurality of filled buckets in transit along conveyor system 52; a plurality of empty buckets in transit along conveyor system 56; and a single bucket supported in dump station 54 by guide rails 72 and 73 over chute 74 with its bottom wall maintained in closed condition by pin 76.

When filler 10 requires a change, a demand signal therefrom will cause pin 76 to be momentarily retracted in order to release the bottom wall of the bucket positioned above chute 74 for downward pivotal movement under the influence of gravity to effect dumping of the batch into the chute. Immediately thereafter, escapement 92 is operated or cycled to release a filled bucket from the dump storage area and pusher bar 78 operated to push the released bucket to a position over chute 74; pin 76 in the meantime having been returned to its original extended position in order to retain the bottom wall of the newly presented filled bucket in closed position until receipt of the next demand signal from the filler. As the newly filled bucket is pushed into position over chute 74, it serves in turn to push its preceeding empty bucket onto conveyor 68 for return to weigher 12; the inlet end of conveyor 68 serving to automatically cam the open bottom wall of the empty bucket upwardly into closed position. The demand signal from filler 10 is also employed to operate or cycle escapement 84 in order to release a replacement filled bucket for passage towards dump station 54. Sensor 94 will signal both the weigher and the filler that a major fault has occurred if a newly filled bucket is not moved into position over chute 74.

Static sensors 86 and 88 are spaced downstream of escapement 84 as required to sense the presence of eleven and eight filled buckets, respectively, within the filled bucket storage or buffer area. When the number of filled buckets drops below eight, sensor 88 signals weigher 12 to commence operating in a free-running condition at its maximum rate in order to deliver filled buckets into the buffer area until filled by eleven buckets. During this time, the number of filled buckets in storage may drop to any number down to and including two. Should the number drop to one, sensor 90 will signal the weigher that a major fault has occurred and the system may be automatically shut down, if desired.

When the number of filled buckets builds up to eleven, sensor 86 signals weigher 12 to stop and stand by for a signal from sensor 88. When weigher 12 is operating at its maximum rate, escapement 82 is operated or cycled by a signal from the weigher that the checkweighing scale has determined that a batch is of predetermined weight and has been discharged through chute 16. If the weighed batch is rejected, or the weigher shut down, escapement 82 remains inoperative and an empty bucket is not released from beneath chute 16. The absence of an empty bucket in the empty bucket storage area will be determined by sensor 22 and registered as a fault preventing dumping of the checkweigher into chute 16.

The foregoing description of the conveyor system is believed sufficient to enable one skilled in the art to practice the present invention, since the sensors employed are conventional and their use in overcontrolling operation of weighers and related apparatus on the basis of transient operating requirements are well known.

We claim:

1. A conveyor system for interfacing a top-filled filler having a substantially constant demand or fixed input batch requirement and a bottom-discharge commodity batch weigher having a variable output potentially in excess of said fixed input, which comprises in combination:

a plurality of batch carrier buckets having open tops and bottoms and a bottom wall connected for vertical pivotal movement between bucket bottom closed and open conditions, said bottom wall when in bottom closed condition being adapted to bottom support said bucket and its enclosed batch and when in bottom open condition permitting gravity discharge of said batch, and said bucket including carrier bars for supporting said bucket when said bottom wall is in bottom open condition;

a first conveyor arranged below said weigher and movable along an essentially horizontal closed loop path for transporting said buckets in succession in bottom wall closed condition, said first conveyor defining a bucket filling station at which empty buckets are arrested from movement along said first conveyor and filled one at a time with batches discharged downwardly thereinto from said weigher and a bucket when filled is released for movement along said first conveyor downstream of said filling station;

a discharge station arranged above said filler and having support means for cooperating with said carrier bars to support a bucket when in bottom wall open condition to permit discharge of its batch downwardly into said filler;

a second conveyor connected into said first conveyor downstream of said filling station for transferring filled buckets in bottom wall closed condition upwardly to said discharge station;

a third conveyor connected into said discharge station for transferring empty buckets in bottom wall closed condition downwardly to said first conveyor and including a downwardly circling gravity feed chute arranged above said first conveyor and delivering empty buckets downwardly onto said first conveyor immediately upstream of said filling station;

means responsive to a demand from said filler to release the bottom wall of a filled bucket supported in said discharge station by said support means to permit movement thereof into said open condition thereby to effect discharge of a batch downwardly into said filler, to replace the thus emptied bucket with a filled bucket in bottom wall closed condition from said second conveyor to transfer said thus emptied bucket onto said third conveyor in bottom wall closed condition and to release a filled bucket from said first conveyor for transfer by said second conveyor to said discharge station; and means responsive to the number of filled buckets on said first conveyor awaiting release therefrom onto said second conveyor for starting and stopping said weigher, whereby to maintain filled buckets awaiting release in numbers accommodating for the demand of said filler.

2. A discharge station for use in association with a conveyor system for supplying batches of a commodity on demand to a top-filled filler from a batch weigher, said system including a plurality of batch carrier buckets characterized as having side, front and rear walls edge joined to define a generally rectangular bucket having an open top and open bottom, a bottom wall connected to said front wall for vertical pivotal movement between bucket bottom closed and open conditions, said bottom wall when in closed condition being adapted to support its bucket and batch contents and when in open condition permitting gravity discharge of said batch contents, and a pair of carrier bars for supporting said bucket when said bottom wall is in open condition; conveyor means for transporting filled buckets while in bottom wall closed condition to said discharge station from said weigher; and other conveyor means for transporting empty buckets while in bottom wall closed condition to said weigher from said discharge station, said discharge station comprising in combination:

a discharge chute arranged above said filler intermediate adjacent ends of said first said conveyor means and said other conveyor means, the spacing between said ends being slightly in excess of the lengthwise dimension of each said bucket in the direction of travel through said discharge station;

a pair of guide rails arranged above said chute to extend essentially horizontally between said adjacent ends, said guide rails underengaging said carrier bars of a bucket to support such bucket in a discharge position above said chute;

a pin member disposed to extend transversely of the path of travel of buckets through said discharge station for normally supporting the bottom wall of a bucket disposed in said discharge position in closed condition, said pin member when operated being momentarily retractable from engagement with the bottom wall of a bucket in said discharge position to permit gravity induced pivotal movement thereof into said bottom open condition;

an escapement operable to permit transfer of one bucket at a time from the first said conveyor means into said discharge position; and a pusher bar operable to push a bucket from the first said conveyor means into said discharge position and thereby push an empty bucket previously occupying said discharge position onto said other conveyor means whereby to effect automatic closure of the bottom wall thereof, said pin member, said escapement and said pusher bar being operable in succession upon demand by said filler whereby in succession a batch is discharged from a first bucket disposed in said discharge position, a bucket is released for transfer from the first said conveyor means and the released bucket is transferred into said discharge position to displace said first bucket from said discharge position and transfer same onto said other conveyor means.

3. An article-carrying bucket for use in combination with apparatus including conveyor means to transport said bucket successively along a path of travel through a station at which a commodity is placed in said bucket and a station at which the commodity is discharged from said bucket, said bucket comprising:

a pair of spaced sidewalls;

spaced front and rear walls, said front and rear walls being edge joined to said sidewalls to form a generally rectangular bucket having an open top and bottom;

a bottom wall hingedly joined to one of said walls for vertical pivotal movement between bucket bottom closing and opening positions, said bottom wall being adapted to be alternately engaged and disengaged by said apparatus such that when engaged it is maintained in a bucket bottom closing position wherein it is adapted to support a commodity within said bucket and when disengaged pivots vertically into said bucket bottom opening position to permit gravity discharge of said supported commodity;

a pair of carrier bars carried one on each of said sidewalls and adapted to be supportingly engaged by said apparatus so as to support said bucket at least when said bottom wall is disengaged by said apparatus; and a bumper formed of a shock-cushioning material, said bumper being attached to one of said front and rear walls to extend outwardly beyond said one wall and said bottom wall in a direction aligned with said path of travel for engagement with the other of said front and rear walls of a like configured adjacent bucket whereby to define a spacer therebetween and outwardly beyond at least one of said sidewalls in a direction transversely of said path of travel.

4. A bucket according to claim 3, wherein said bottom wall has side, front and rear marginal edges thereof disposed outwardly of said side, front and rear walls, respectively, and includes side, front and rear flanges arranged to upstand from said side, front and rear marginal edges, respectively.

5. In a conveyor system including a plurality of buckets, conveyor means tending to move said buckets in succession along a path of travel and an escapement operable to release one bucket at a time from the downstream end of a line of buckets extending upstream from said escapement for movement by said means along said path of travel, the improvement wherein:

each of said buckets is formed with escapement cooperating stop means disposed to project outwardly thereof in a direction transversely of said path of travel; and said escapement includes downstream and upstream members mounted for movement transversely of said path of travel, and operating means having a release operating cycle for releasing one bucket at a time from the downstream end of said line, said operating means during a normal release cycle sequentially moving said members from a first condition into a second condition and returning said members to said first condition, said downstream and upstream members when in said first condition being disposed relatively inwardly and outwardly of said stop means of said buckets to position said downstream member for travel arresting engagement with said stop means of a first downstream one of said buckets to be released, and said downstream and upstream members when in said second condition being disposed relatively outwardly and inwardly of said stop means of said buckets whereby to release said first downstream one of said buckets and to position said upstream member for travel arresting engagement with said stop means of a next adjacent bucket whereby said upstream member serves as a fail-safe device to prevent passage of said next adjacent bucket by said escapement in the event of failure of said operating means to return said members to said first condition during said operating cycle.

6. A conveyor system according to claim 5, wherein each said bucket comprises front and rear walls, said front and rear walls being edge joined to said side walls to form a generally rectangular bucket having an open top and bottom, a bottom wall hingedly joined to one of said walls for vertical pivotal movement between bucket bottom closed and open conditions, said bottom wall being adapted to be alternately engaged and disengaged by said apparatus such that when engaged it is maintained in a bucket bottom closed condition wherein it is adapted to support a commodity within said bucket and when disengaged pivots vertically into said bucket bottom open condition to permit gravity discharge of said supported commodity, a pair of carrier bars carried one on each of said side walls and adapted to be supportingly engaged by said apparatus so as to support said bucket at least when said bottom wall is disengaged by said apparatus, and a bumper device formed of a shock-cushioning material, said bumper device being attached to one of said front and rear walls to extend outwardly beyond said one wall and said bottom wall in a direction aligned with said path of travel for engagement with the other of said front and rear walls of a like configured adjacent bucket, whereby to define a spacer between adjacent buckets, and to extend outwardly beyond at least one of said side walls transversely of said path of travel, whereby to define said stop means.

7. A conveyor system according to claim 6, wherein said members are mounted for reciprocating movement transversely of said path of travel, and said operating means includes linkage means to interconnect said members for simultaneous movement in opposite directions and an operator for imparting movement to said linkage means whereby to move said members between first and second conditions.

* * * * *